(12) United States Patent
Yu

(10) Patent No.: US 11,411,846 B2
(45) Date of Patent: Aug. 9, 2022

(54) METHOD AND A DEVICE FOR HOTSPOT LEASING

(71) Applicant: SHANGHAI SHANGWANG NETWORK TECHNOLOGY CO., LTD., Shanghai (CN)

(72) Inventor: Tingting Yu, Shanghai (CN)

(73) Assignee: SHANGHAI SHANGWANG NETWORK TECHNOLOGY CO., LTD., Shanghai (CN)

(*) Notice: Subject to any disclaimer, the term of this patent is extended or adjusted under 35 U.S.C. 154(b) by 265 days.

(21) Appl. No.: 16/804,009

(22) Filed: Feb. 28, 2020

(65) Prior Publication Data

US 2020/0204467 A1 Jun. 25, 2020

Related U.S. Application Data

(63) Continuation of application No. PCT/CN2018/100207, filed on Aug. 13, 2018.

(51) Int. Cl.
*G06Q 30/06* (2012.01)
*H04L 43/0811* (2022.01)
(Continued)

(52) U.S. Cl.
CPC ...... *H04L 43/0811* (2013.01); *G06Q 30/0645* (2013.01); *H04L 12/145* (2013.01);
(Continued)

(58) Field of Classification Search
CPC ... H04L 43/0811; H04L 12/145; H04L 43/16; G06Q 30/0645; H04W 4/02; H04W 28/10
See application file for complete search history.

(56) References Cited

U.S. PATENT DOCUMENTS

| 10,038,729 B1* | 7/2018 | Ramalingam ......... H04W 48/12 |
| 2003/0060199 A1* | 3/2003 | Khalil ..................... H04L 61/00 |
| | | 455/435.1 |

(Continued)

FOREIGN PATENT DOCUMENTS

| CN | 103596121 A | 2/2014 |
| CN | 103747096 A | 4/2014 |

(Continued)

*Primary Examiner* — Chris Parry
*Assistant Examiner* — Hassan A Khan
(74) *Attorney, Agent, or Firm* — Kilpatrick Townsend & Stockton, LLP

(57) ABSTRACT

A method and a device for hotspot leasing are provided. The method comprises: acquiring a data request packet transmitted by a requesting user (S11); based on a target data request packet acquired by a supplying user from the data request packet, transmitting hotspot information provided by the supplying user to the requesting user corresponding to the target data request packet, and establishing a hotspot leasing contract between the requesting user and the supplying user (S12). Therefore, demand docking is provided for both parties of leasing and selling by means of the data request packet, so that users with excess data provide data to users with data gaps. Urgent needs of one or more surrounding users are solved, near-field social contact for mutual assistance is established, and data utilization is improved.

20 Claims, 3 Drawing Sheets

(51) Int. Cl.
*H04L 12/14* (2006.01)
*H04L 43/16* (2022.01)
*H04W 4/02* (2018.01)
*H04W 28/10* (2009.01)

(52) U.S. Cl.
CPC .............. *H04L 43/16* (2013.01); *H04W 4/02* (2013.01); *H04W 28/10* (2013.01)

(56) References Cited

U.S. PATENT DOCUMENTS

| | | | | |
|---|---|---|---|---|
| 2004/0053599 | A1* | 3/2004 | Karaoguz | H04M 15/93 455/408 |
| 2006/0251256 | A1* | 11/2006 | Asokan | H04W 12/50 380/270 |
| 2008/0139172 | A1* | 6/2008 | Gamel | H04M 15/00 455/406 |
| 2008/0151847 | A1* | 6/2008 | Abujbara | G06F 21/629 370/338 |
| 2009/0081996 | A1* | 3/2009 | Duggal | H04L 67/306 455/406 |
| 2009/0093232 | A1* | 4/2009 | Gupta | H04W 12/08 455/410 |
| 2009/0199281 | A1* | 8/2009 | Cai | H04M 15/93 726/7 |
| 2010/0093342 | A1* | 4/2010 | Ramachandra Rao | H04W 12/06 455/432.1 |
| 2010/0290442 | A1* | 11/2010 | Souissi | H04W 88/04 370/338 |
| 2011/0086611 | A1* | 4/2011 | Klein | H04M 15/00 455/407 |
| 2011/0099072 | A1* | 4/2011 | Karaoguz | H04M 17/02 705/14.64 |
| 2011/0105077 | A1* | 5/2011 | Chandrasekaran | H04W 4/02 455/406 |
| 2012/0077459 | A1* | 3/2012 | Karaoguz | H04W 36/0038 455/406 |
| 2012/0110640 | A1* | 5/2012 | Donelson | H04L 63/102 726/3 |
| 2012/0303823 | A1* | 11/2012 | Nair | H04W 48/18 709/227 |
| 2013/0067081 | A1* | 3/2013 | Liu | H04W 12/082 709/225 |
| 2013/0184009 | A1* | 7/2013 | Attar | H04W 4/021 455/456.2 |
| 2013/0198274 | A1* | 8/2013 | Papakipos | H04W 76/11 709/204 |
| 2013/0210379 | A1* | 8/2013 | Cloutier | H04W 84/105 455/411 |
| 2013/0304631 | A1* | 11/2013 | Wang | H04M 15/43 709/225 |
| 2014/0080534 | A1* | 3/2014 | Farhadi | H04W 88/04 455/509 |
| 2014/0129053 | A1* | 5/2014 | Kleve | G07F 17/0057 701/2 |
| 2014/0348152 | A1* | 11/2014 | Vanderhulst | H04W 48/16 370/338 |
| 2015/0055477 | A1* | 2/2015 | Narendran | H04L 41/30 370/235 |
| 2015/0341965 | A1* | 11/2015 | Spencer | H04W 8/18 370/338 |
| 2016/0283559 | A1* | 9/2016 | Lunt | H04L 63/10 |
| 2017/0310640 | A1* | 10/2017 | Chechani | H04W 76/12 |
| 2019/0126867 | A1* | 5/2019 | Rai | H04L 67/1095 |
| 2019/0166504 | A1* | 5/2019 | Wu | H04W 16/14 |
| 2020/0204467 | A1* | 6/2020 | Yu | H04L 43/16 |
| 2020/0396609 | A1* | 12/2020 | Majdabadi | H04W 12/068 |
| 2021/0209663 | A1* | 7/2021 | Kinnunen | H04M 15/41 |

FOREIGN PATENT DOCUMENTS

| | | |
|---|---|---|
| CN | 105069669 A | 11/2015 |
| CN | 105610989 A | 5/2016 |
| CN | 105657635 A | 6/2016 |
| CN | 106330471 A | 1/2017 |
| CN | 106936604 A | 7/2017 |
| CN | 107967639 A | 4/2018 |

* cited by examiner

METHOD AND A DEVICE FOR HOTSPOT LEASING

CROSS REFERENCE TO THE RELATED APPLICATION

This application is the continuation application of International Application No. PCT/CN2018/100207, filed on Aug. 13, 2018, which is based upon and claims priority to Chinese Patent Application No. 201710761825.9, filed on Aug. 30, 2017, the entire contents of which are incorporated herein by reference.

TECHNICAL FIELD

The present application relates to computers, more specifically relates to a method and a device for hotspot leasing.

BACKGROUND

With the development of communication technology, people increasingly use data services of mobile terminals to obtain information. In order to solve the problem of accessing the Internet by mobile users, a current approach is that users purchase data plans for Internet provided by operators. Generally, data plans are primarily in form of a data plan, a holiday plan, a monthly plan or a data plan that is charged on time. A data plan is generally valid for a limited time and there are geographical restrictions. The unit price for purchasing a temporary data plan is high. There are problems that some users do not run out of data and thus waste data at the end of a month, while other users do not have enough data at the end of a month. For example, if a user surfs the Internet or chats only a few times in a month, there may be a large portion of communication data left of the monthly data plan. If the left communication data of the month is cleared by the operator, it will cause a waste of communication data.

SUMMARY

It is an objective of the present application to provide a method and a device for hotspot leasing, which solves problems such as users' urgent need of data, geographical restrictions, and the high unit price for purchasing temporary data plans in the prior art.

According to an aspect of the present application, it is provided a method for hotspot leasing at a network device. The method comprises:

acquiring a data request packet transmitted by a requesting user;

based on a target data request packet acquired by a supplying user from the data request packet, transmitting hotspot information provided by the supplying user to the requesting user corresponding to the target data request packet, and establishing a hotspot leasing contract between the requesting user and the supplying user.

Further, the method also comprises:

determining whether the requesting user is allowed to transmit the data request packet based on historic rating information of the requesting user or based on historic rating information and historic valid hotspot sharing behavior information of the requesting user;

and/or determining whether the supplying user is allowed to acquire the target data request packet from the data request packet based on historic valid hotspot sharing behavior information of the supplying user or based on historic valid hotspot sharing behavior information and historic rating information of the supplying user.

Further, in the above method, after acquiring the data request packet of the requesting user, the method comprises:

displaying the acquired data request packet on a map of data request packets based on location information of the requesting user, wherein the data request packet comprises a data limit, user information of the requesting user, paid fees, and location information.

Further, in the above method, transmitting the hotspot information provided by the supplying user to the requesting user corresponding to the target data request packet and establishing the hotspot leasing contract between the requesting user and the supplying user comprises:

transmitting the hotspot information provided by the supplying user to the requesting user corresponding to the target data request packet for the requesting user and the supplying user to establish a network link, wherein the hotspot information includes a hotspot name and password information for access;

establishing the hotspot leasing contract between the requesting user and the supplying user based on a received test result of the network link between the requesting user and the supplying user.

Further, in the above method, a test for the network link between the requesting user and the supplying user comprises at least one of:

a test for connectivity of the link;

a test for signal strength of the link;

a test as to whether the data limit of the target data request packet is less than or equals to a data threshold of the supplying user.

Further, in the above method, after establishing the hotspot leasing contract between the requesting user and the supplying user, the method comprises:

transmitting acquired data usage information for the hotspot leasing contract to the requesting user or the supplying user based on a query request from the requesting user or the supplying user.

Further, in the above method, after establishing the hotspot leasing contract between the requesting user and the supplying user, the method comprises:

converting hotspot data used by the requesting user to a corresponding fee to be charged based on a preset trigger condition and forwarding the fee to be charged to the supplying user, and terminating the hotspot leasing contract.

Further, the preset trigger condition comprises at least one of:

hotspot data used by the requesting user reaches the data limit of the target data request packet;

the network link between the requesting user and the supplying user is disconnected when data used by the requesting user does not reach the data limit of the target data request packet;

the network link between the requesting user and the supplying user is disconnected when total data used by the requesting user and the supplying user reaches a data threshold of the supplying user.

Further, in the above method, after terminating the hotspot leasing contract, the method comprises:

determining whether the requesting user is allowed to rate the supplying user in terms of satisfaction based on historic rating information and/or historic valid hotspot sharing behavior information of the requesting user;

and/or determining whether the supplying user is allowed to rate the requesting user in terms of satisfaction based on historic valid hotspot sharing behavior information and/or historic rating information of the supplying user.

Further, in the above method, before establishing the hotspot leasing contract between the requesting user and the supplying user, the method comprises:

notifying the requesting user to shut down automatic update behavior from occurring when connected to the hotspot.

Further, in the above method, after establishing the hotspot leasing contract between the requesting user and the supplying user, the method comprises:

based on data usage information for the hotspot leasing contract and a preset alerting data amount, transmitting notification information indicating that the total data used has reached the preset alerting data amount to the requesting user and/or the supplying user.

Further, in the above method, the method comprises:

creating an instant communication between the requesting user and the supplying user based on the hotspot leasing contract between the requesting user and the supplying user.

According to another aspect of the present application, it is provided a method for hotspot leasing at an equipment of a requesting user. The method comprises:

transmitting a data request packet of the requesting user;

establishing a hotspot leasing contract with a supplying user based on received hotspot information provided by the supplying user.

Further, the data request packet comprises a data limit, user information of the requesting user, paid fees, and location information.

Further, in the above method, establishing the hotspot leasing contract with the supplying user based on the received hotspot information provided by the supplying user comprises:

receiving hotspot information transmitted by a network device and provided by the supplying user, and establishing a network link with the supplying user;

performing a network link test on the network link;

establishing the hotspot leasing contract with the supplying user based on a test result.

Further, the network link test comprises at least one of:

a test for connectivity of the link;

a test for signal strength of the link.

Further, in the above method, after terminating the hotspot leasing contract, the method comprises:

transmitting rating information in terms of satisfaction on the supplying user.

According to a further aspect of the present application, it is provided a method for hotspot leasing at an equipment of a supplying user. The method comprises:

acquiring a target data request packet from a data request packet;

generating hotspot information and transmitting the hotspot information to a network device, and establishing a hotspot leasing contract with a requesting user corresponding to the target data request packet on a basis of the network device transmitting the hotspot information to the requesting user.

Further, in the above method, after establishing the hotspot leasing contract with the requesting user, the method comprises:

receiving a fee to be charged corresponding to the hotspot data used by the requesting user which is transmitted by the network device.

Further, in the above method, acquiring a target data request packet from the data request packet comprises:

acquiring one or more target data request packets from the data request packets displayed on a map of data request packets, wherein the data request packet comprises a data limit, user information of a requesting user, paid fees, and location information.

Further, in the above method, establishing the hotspot leasing contract with the requesting user comprises:

performing a network link test on the network link;

establishing the hotspot leasing contract with the requesting user based on a test result.

Further, the network link test comprises at least one of:

a test for connectivity of the link;

a test for signal strength of the link;

a test as to whether the data limit of the target data request packet is less than or equals to a data threshold of the supplying user.

Further, in the above method, after terminating the hotspot leasing contract, the method comprises:

transmitting rating information on the requesting user in terms of satisfaction.

According to yet another aspect of the present application, it is also provided a computer readable medium having computer readable instructions stored thereon, the computer readable instructions being executable by a processor to implement the above mentioned methods.

According to yet a further aspect of the present application, it is also provided a network device for hotspot leasing. The network device comprises:

one or more processors; and a memory storing computer readable instructions, wherein the computer readable instructions, when executed, cause the processor to perform the operations of the above mentioned methods.

According to another aspect of the present application, it is also provided an equipment of a requesting user for hotspot leasing. The equipment of the requesting user comprises:

one or more processors; and a memory storing computer readable instructions, wherein the computer readable instructions, when executed, cause the processor to perform the operations of the above mentioned methods.

According to a further aspect of the present application, it is also provided an equipment of a supplying user for hotspot leasing. The equipment of the supplying user comprises:

one or more processors; and a memory storing computer readable instructions, wherein the computer readable instructions, when executed, cause the processor to perform the operations of the above mentioned methods.

Compared with the prior art, in the present application, a data request packet of a requesting user is acquired; based on a target data request packet acquired by a supplying user from the data request packet, hotspot information provided by the supplying user is then transmitted to the requesting user corresponding to the target data request packet, and a hotspot leasing contract between the requesting user and the supplying user is established. Therefore, demand docking is provided for both parties of leasing and selling by means of the data request packet, so that users with excess data provide data to users with data gaps. Urgent needs of one or more surrounding users are solved, near-field social contact for mutual assistance is established, and data utilization is improved.

DESCRIPTIONS OF THE DRAWINGS

Other features, objects, and advantages of the present application will become more apparent by reading the detailed description of non-limiting embodiments with reference to the following drawings.

The identical or similar reference numerals in the drawings represent the identical or similar components.

DETAILED EMBODIMENTS

The application is further described in detail below with reference to the accompanying drawings.

In a typical configuration of the present application, a terminal, a device of a service network and a trusted party all include one or more processors (CPUs), an input/output interface, a network interface and a memory.

The memory may include a non-permanent memory, a random access memory (RAM) and/or a non-volatile memory and the like in a computer-readable medium, such as a read-only memory (ROM) or a flash memory (flash RAM)). A memory is an example of a computer-readable medium.

A computer-readable medium comprises permanent and non-permanent, movable and non-movable media and may implement information storage by means of any method or technology. Information may be computer-readable instructions, data structures, program modules or other data. The examples of a computer storage medium include but are not limited to a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which may be used to store information that may be accessed by a computing device. According to the definition herein, the computer-readable medium does not include a non-transitory computer-readable medium, such as a modulated data signal and a carrier.

Figure 1:
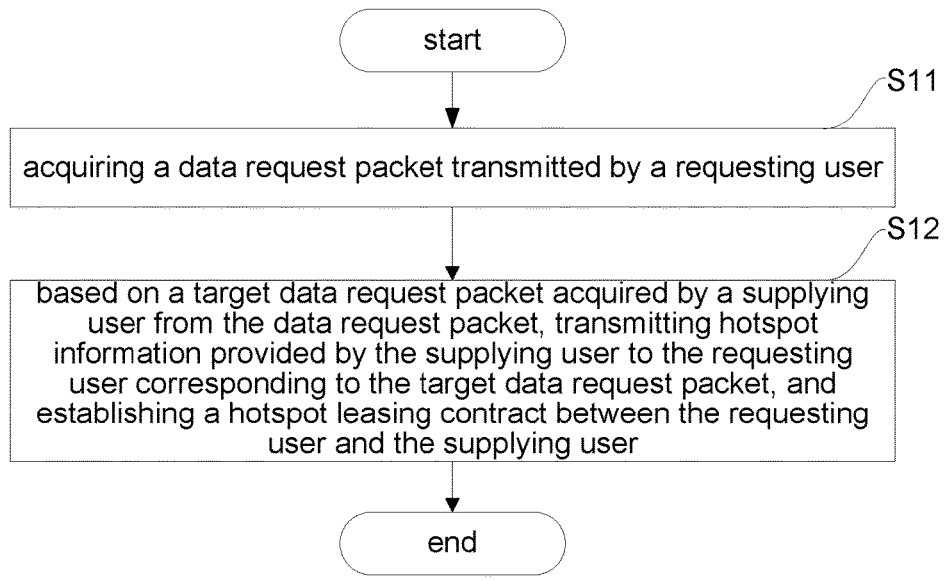
FIG. 1 shows a schematic flowchart of a method for hotspot leasing at a network device according to an aspect of the present application.

FIG. 1 shows a schematic flowchart of a method for hotspot leasing at a network device according to an aspect of the present application. The method comprises step S11 and step S12. At step S11, a data request packet transmitted by a requesting user is acquired. At step 12, based on a target data request packet acquired by a supplying user from the data request packet, hotspot information provided by the supplying user is transmitted to the requesting user corresponding to the target data request packet and a hotspot leasing contract between the requesting user and the supplying user is established. Therefore, demand docking is provided for both parties of leasing and selling by means of the data request packet, so that users with excess data provide data to users with data gaps. Urgent needs of one or more surrounding users are solved, near-field social contact for mutual assistance is established, and data utilization is improved.

It should be noted that the network device may be a server, or multiple servers connected through a local area network or multiple servers connected through the Internet, or a cloud composed of multiple servers. Here, the cloud is composed of a massive number of computers or network servers based on Cloud Computing, wherein cloud computing is a type of distributed computing, which is a super virtual computer composed of a group of loosely coupled computer sets.

Specifically, at step S11, a data request packet transmitted by a requesting user is acquired. Here, the requesting user is a user with data gaps. The data request packet may include basic information of the data in need, e.g., the amount of data in need. In an embodiment of the present application, the data request packet may be a red packet, or may include fees paid by the requesting user, so that monetization of data is implemented for the user with excess data by offering red packets in seek of hotspot.

Specifically, at step 12, based on a target data request packet acquired by the supplying user from the data request packet, hotspot information provided by the supplying user is transmitted to the requesting user corresponding to the target data request packet and a hotspot leasing contract between the requesting user and the supplying user is established. Here, the supplying user is a user with excess data and is the data owner in the hotspot leasing contract. The supplying user may select one or more data request packets as the target data request packet from data request packets and provide data to the requesting user corresponding to the target data request packet. It is implemented by a network device transmitting the hotspot information provided by the supplying user to the requesting user corresponding to the target data request packet so as to establish a hotspot leasing contract between the requesting user and the supplying user. When the two parties have fulfilled the contract, that is, the data provided by the supplying user reaches a data threshold of the target data request packet, or when one of the parties actively ends the fulfillment of the contract for some reason, the contract lapses. Hotspot information provided by the supplying user may include hotspot name information, password information for access, MAC address information or geographic location information, etc., wherein the hotspot name information includes service set identification (SSID) information. A hotspot leasing contract is established between the supplying user and the requesting user by means of the supplying user providing sharing of excess data in a personal hotspot and the requesting user connecting to and using the hotspot. Utilization of data for network access is improved and urgent needs of one or more surrounding users are solved.

In an embodiment of the present application, the method further comprises:

step S01, determining whether the requesting user is allowed to transmit the data request packet based on historic rating information of the requesting user or based on historic rating information and historic valid hotspot sharing behavior information of the requesting user;

and/or step S02, determining whether the supplying user is allowed to acquire the target data request packet from the data request packets based on historic valid hotspot sharing behavior information of the supplying user or based on historic valid hotspot sharing behavior information and historic rating information of the supplying user.

Here, when the requesting user transmits a data request packet, risk control may be performed on the requesting user to determine whether the requesting user is allowed to transmit a data request packet. Risk control may be performed according to historic rating information of the requesting user. Risk control may be performed comprehensively according to historic rating information and historic valid hotspot sharing behavior information of the requesting user to determine whether the requesting user is in a list of users prohibited from transmitting data request packets, i.e., a blacklist of requesting users. According to the historic rating information or historic rating information as well as historic valid hotspot sharing behavior information of the requesting user, conditions for admission into the blacklist of requesting users include historic negative ratings or complaints, malicious scalping such as maliciously not providing valid hotspot sharing behavior after acquiring the data request packets of other requesting users, and other violations. The supplying user is guaranteed to grab valid data request packets and is able to provide a valid hotspot and is prevented from harassment for network needs from malicious users. In another aspect, risk control may also be performed on the supplying user when the supplying user acquires the data request packet. It is determined whether the supplying user is in a list of users prohibited from acquiring data request packets, i.e., a blacklist of supplying users. Conditions for admission into the blacklist of supplying users include low compliance rate of contracts, historic negative ratings or complaints, malicious scalping and other violations. Penalties are applied to dishonest supplying users who maliciously cut off data provision. Supplying users with extremely low credit ratings are included in the blacklist of supplying users. Penalties are applied to the supplying users according to for example the credit ratings of the supplying users. Users with occasional breach of trust are allowed to grab data request packets. It is not suitable for users with frequent breach of trust to provide data service and grab data request packets, thus they are prohibited from grabbing the data request packets.

In an embodiment of the present application, the method comprises step S11', wherein the acquired data request packet is displayed on a map of data request packets based on location information of the requesting user. Wherein the data request packet comprises a data limit, user information of a requesting user, paid fees, and location information. Here, the data request packet transmitted by the requesting user may be in form of a red packet which is configured with a data limit and further includes a fee of the red packet paid by the requesting user, information of the requesting user, and location information. The red packet is displayed on a map of red packets based on the location information to facilitate supplying users to grab the red packet from the map of red packets and acquire a target red packet so as to establish a hotspot leasing contract with a requesting user corresponding to the target red packet. Information of the above requesting user may include username and contact information of the requesting user, facilitating both parties to establish near-field hotspot connection and guarantee signal strength. The data limit configured for the red packet corresponds to the fee paid by the requesting user, satisfying a calculation mechanism for data monetization, such as 0.1 RMB for 1M of data.

In an embodiment of the present application, at step S12, the hotspot information provided by the supplying user is transmitted to the requesting user corresponding to the target data request packet for the requesting user and the supplying user to establish a network link, wherein the hotspot information includes a hotspot name and password information. A hotspot leasing contract between the requesting user and the supplying user is established based on a received test result of the network link between the requesting user and the supplying user. Wherein a test for the network link between the requesting user and the supplying user comprises at least one of: a test for connectivity of the link; a test for signal strength of the link; a test as to whether the data limit of the target data request packet is less than or equals to a data threshold of the supplying user. Here, before establishing the hotspot leasing contract between the requesting user and the supplying user, a test for hotspot is required. For example, connectivity of the network link for both parties, link signal strength, whether the data limit for the target data request packet is less than or equals to a data threshold of the supplying user, etc. is tested. The network device transmits the hotspot information provided by the supplying user to the requesting user corresponding to the red packet grabbed by the supplying user. The requesting user and the supplying user establish a network link and perform a test on the network link, such as a signal strength test or a 5-second duration test. Problems that might occur after the hotspot leasing contract is established are prevented, such as poor network connectivity, low success rate of connection, poor user experience and a condition where the requesting user has to reestablish a hotspot leasing contract with other supplying users. After successful test on the connectivity of the network link between the requesting user and the supplying user, the supplying user provides sharing of excess data in form of a personal hotspot and the requesting user connects to and uses the hotspot. A hotspot leasing contract is established between both parties.

In an embodiment of the present application, user A with data gaps seeks for leasing of data for network access by offering a red packet. User A pays the red packet, which is guaranteed by the network device. The red packet is displayed on a map of red packets. User B with excess data as the data owner may grab one or more red packets from the map of red packets. For each red packet that is grabbed, a data limit of the red packet is compared with a data threshold of user B. If the data limit of the red packet is greater than the data threshold of user B, user B is not qualified for user A's need for data and thus a network link between both parties does not need to be established. With a comparison of the data limit of the red packet with the data threshold of the data owner, blind establishment of network link is prevented, thereby ensuring that both parties establish a valid hotspot leasing contract. When the data limit of the red packet is less than or equals to the data threshold of user B, risk control, i.e., security risk confirmation, may be performed according to the hotspot information provided by user B. If user B is a litigate user and is able to provide a valid hotspot, the hotspot information provided by user B is transmitted to user A and a network link between both parties is established. If user B is in the blacklist, after security risk of the hotspot is confirmed, secure hotspot information is transmitted to user A, wherein conditions for admission into the blacklist include low compliance rate of hotspot leasing contracts, historic negative ratings or complaints, malicious scalping, malicious provision of hotspots, and other violations. User A acquires the hotspot name and password and connects to the Internet. Network security and data usage under the hotspot leasing contract for user A is guaranteed, thereby satisfying data needs for network access of user A. It should be noted that when user B grabs a plurality of red packets, tests on hotspots could be performed sequentially according to the time when the red packets are grabbed. A data limit of each red packet is compared with the remaining data threshold of user B one by one after user B providing data corresponding to a previous red packet, and a network link is established between user B and corresponding requesting users to whom user B is able to provide data service. It should be noted that the data threshold of user B may be currently actual remaining data of user B, or may be remaining data minus an evaluated amount of data by user B. In an example, a current monthly data plan for user B has 2G of data and there is 1G of data remaining when the red packet is grabbed. The actual remaining data, e.g., 1G of data, may be set as the data threshold, or a portion of the actual remaining data may be set as the data threshold, such as one half of the remaining data. Supplying users may be provided with various choices of settings for the data threshold. The network device determines whether the data which the supplying user is able to provide may satisfy the data needs from the grabbed red packet according to the corresponding data threshold selected by the supplying user. Users are provided with various choices by multiple settings for data threshold. Users with excess data are encouraged to provide hotspot sharing more actively, thereby satisfying data needs of requesting users while maintaining self-sufficiency.

In an embodiment of the present application, after the hotspot leasing contract between the requesting user and the supplying user is established, based on a query request from the requesting user or the supplying user, the acquired data usage information for the hotspot leasing contract is transmitted to the requesting user or the supplying user. Here, the data usage information for the hotspot leasing contract may be acquired and transmitted according to a user request, or the data usage information for the hotspot leasing contract may be monitored in real time. Both parties for the hotspot leasing and selling, i.e., the requesting user and the supplying user, may query data usage details so that data usage management is transparent. The supplying user may view the data usage for one or more requesting users who are provided with data by the supplying user. Billing on the requesting users may be monitored by the real time monitoring of data usage information. In an example, based on a preset trigger condition, hotspot data used by the requesting user is converted to a corresponding fee to be charged, which is forwarded to the supplying user, and the hotspot leasing contract is terminated. Wherein the preset trigger condition comprises at least one of: 1) the hotspot data used by the requesting user reaches the data limit of the target data request packet; 2) the network link between the requesting user and the supplying user is disconnected when the data used by the requesting user does not reach the data limit of the target data request packet; 3) the network link between the requesting user and the supplying user is disconnected when total data used by the requesting user and the supplying user reaches a data threshold of the supplying user.

In an embodiment of the present application, after the hotspot leasing contract between the requesting user and the supplying user is established, the contract is fulfilled. The network device records actual data usage of the requesting user and converts it into a fee to be charged in a red packet. When the data used by the requesting user reaches the data limit configured for the red packet, the red packet is transferred into the account of the supplying user and the hotspot connection goes into lapse. When the hotspot is disconnected according to the contract or accidentally, the amount of fees for the red packet to be grabbed by the supplying user is calculated according to actual data usage of the requesting user. Here, the amount of fees in red packets may be withdrawn or may be used in seek of hotspot sharing. When the contract has been fulfilled, disconnection of hotspot according to the contract occurs and the network is disconnected. Accidental disconnection of hotspot occurs due to lack of data of the supplying user, manual disconnection of the hotspot by the supplying user, or failures such as power off of a mobile phone. Both parties may communicate online regarding accidental disconnection of the hotspot. Ratings and appeals are available after accidental disconnection of the hotspot, which are provided to a penalty mechanism as a reference. Penalties and punishments may apply after the transaction is completed, for example three days after the withdrawal of the money in the red packet.

In an embodiment of the present application, after the hotspot leasing contract is terminated, it is determined whether the requesting user is allowed to rate the supplying user in terms of satisfaction based on historic credit rating information and/or historic valid hotspot sharing behavior information of the requesting user;

and/or it is determining whether the supplying user is allowed to rate the requesting user in terms of satisfaction based on historic valid hotspot sharing behavior information and/or historic rating information of the supplying user.

Here, both parties who established the hotspot leasing contract may rate each other. Risk control may be performed on the users before rating and only rating information from qualified users in terms of satisfaction is acquired. Risk control is mainly dependent on whether there is a valid hotspot sharing behavior and whether rating contents are legal and compliant. When a valid hotspot connection is completed, both parties perform ratings. At this point, the network device may formulate some rewarding mechanisms for encouraging the users to rate. The network device determines whether the user is qualified for rating before rating. Malicious raters will be indicated by risk control and will be not allowed to rate. A main purpose of risk control is to ensure the integrity and effectiveness of ratings as well as the reference value for credit rating. Therefore, users with no valid hotspot connection or with illegal and incompliant rating contents are not allowed to rate due to lack of reference values. Rating information on each other in terms of satisfaction may provide a pre-reference for potential offline conflicts and may provide a data basis for risk control.

In an embodiment of the present application, before the hotspot leasing contract between the requesting user and the supplying user is established, it is necessary to notify the requesting user to shut down automatic update behavior from occurring when connected to the hotspot. Here, the requesting user is notified by a push (a distribution mechanism) to shut down potential automatic update behavior in app stores when connected to a wireless hotspot. Programs of the requesting user are prevented from consuming data in background when successfully connected to the wireless hotspot.

In an embodiment of the present application, the method comprises: based on data usage information for the hotspot leasing contract and a preset alerting data amount, transmitting notification information indicating that the total data used has reached the preset alerting data amount to the requesting user and/or the supplying user. Here, the preset alerting data amount is the remaining data amount when the total data used approaches the data threshold, such as alerting when there is 5M of data remaining from the data threshold. Information on reaching the preset alerting data amount is notified to the supplying user by continuously detecting whether the data used has reached the preset alerting data amount. This helps the supplying user to disconnect the network when the total data used has reached the data threshold, or notifies the requesting user to arrange net surfing reasonably. For example, when the data threshold is approached, it is not appropriate to download videos or watch videos, among others. It should be understood that the data used by the requesting user and a data limit corresponding to the paid fee of the red packet may also be detected in real time. If the data used by the requesting user approaches the data limit corresponding to the paid fee, the requesting user is notified of such situation.

In an embodiment of the present application, the method comprises: at step S13, creating an instant communication between the requesting user and the supplying user based on the hotspot leasing contract between the requesting user and the supplying user. Here, after the hotspot leasing contract between the requesting user and the supplying user is established, the requesting user utilizes the hotspot information provided by the supplying user for network access. A quick communication path such as a chatting room may be established for both parties for the contract at this point, to facilitate online problem solving for both parties during the fulfillment of the contract.

According to another aspect of the present application, it is provided a method for hotspot leasing at an equipment of a requesting user. The method comprises: at step S21, transmitting a data request packet of the requesting user; at step S22, establishing a hotspot leasing contract with a supplying user based on received hotspot information provided by the supplying user. The requesting user with data gaps seeks for leasing of data for network access by data request packets and receives the hotspot name and password provided by the supplying user for network access, thus a hotspot leasing contract is established with the supplying user. Wherein the data request packet comprises a data limit, user information of the requesting user, paid fees, and location information. The data request packet may be a red packet. The red packet is configured with a data limit and further includes fee of the red packet paid by the requesting user, information of the requesting user, and location information. Monetization of data is implemented for users with excess data by offering a red packet in seek of hotspot. Location information is used to display the red packet on the map of red packets and facilitates the supplying user to grab the red packet from the map of red packets. Information of the requesting user may include username and contact information of the requesting user, facilitating both parties to establish near-field hotspot connection and guarantee signal strength. The data limit configured for the red packet corresponds to the fee paid by the requesting user, satisfying a calculation mechanism for data monetization, such as 0.1 RMB for 1M of data.

Here, the equipment of the requesting user is a user equipment of the user with data gaps. The user equipment includes but is not limited to any type of mobile electronic product capable of human-machine interaction with users via touchpad, for example, a smart phone, a tablet, etc. The mobile electronic products may run on any operating system, such as android operating system, iOS operating system, etc.

In an embodiment of the present application, at step S22, hotspot information transmitted by a network device and provided by the supplying user is received, and a network link with the supplying user is established; a test is performed on the network link and a test result is obtained; a hotspot leasing contract with the supplying user is established based on the test result. Wherein a test for the network link between the requesting user and the supplying user comprises at least one of: a test for connectivity of the link; a test for signal strength of the link; a test as to whether the data limit of the target data request packet is less than or equals to a data threshold of the supplying user. Here, after receiving the hotspot information transmitted by the network device and provided by the supplying user, a test is performed on the hotspot, such as a signal strength test or a 5-second duration test. Problems that might occur after the hotspot leasing contract is established are prevented, such as poor network connectivity, low success rate of connection, poor user experience and a condition where the requesting user has to reestablish a hotspot leasing contract with other supplying users. It is tested whether the data limit of the target data request packet is less than or equals to the data threshold of the supplying user. If the data limit of the data request packet is greater than the data threshold of the supplying user, the supplying user is not qualified for the requesting user's need for data and thus a network link between both parties does not need to be established. With a comparison of the data limit of the data request packet with the data threshold of the supplying user, blind establishment of network link is prevented, thereby ensuring that both parties establish a valid hotspot leasing contract. The hotspot leasing contract with the supplying user is established after successful hotspot test.

In an embodiment of the present application, after the hotspot leasing contract is terminated, rating information in terms of satisfaction on the supplying user may be transmitted. It could provide a pre-reference for potential offline conflicts and a data basis for risk control. Wherein before rating information in terms of satisfaction on the supplying user is transmitted, risk control may be performed on the requesting user. In an example, it is determined whether the requesting user belongs to users in a preset blacklist. If not, rating information in terms of satisfaction on the supplying user is transmitted. Wherein users in the preset blacklist are determined by the network device via filter processing based on historic valid hotspot sharing behavior information and historic credit rating information of the user. Here, risk control is mainly dependent on whether there is a valid hotspot sharing behavior and whether rating contents are legal and compliant. It is determined whether the requesting user is qualified for rating before the requesting user rates. Malicious raters will be indicated by risk control and will be not allowed to rate. A main purpose of risk control is to ensure the integrity and effectiveness of ratings as well as the reference value for credit rating. Therefore, users with no valid hotspot connection or with illegal and incompliant rating contents are not allowed to rate due to lack of reference values.

Figure 2:
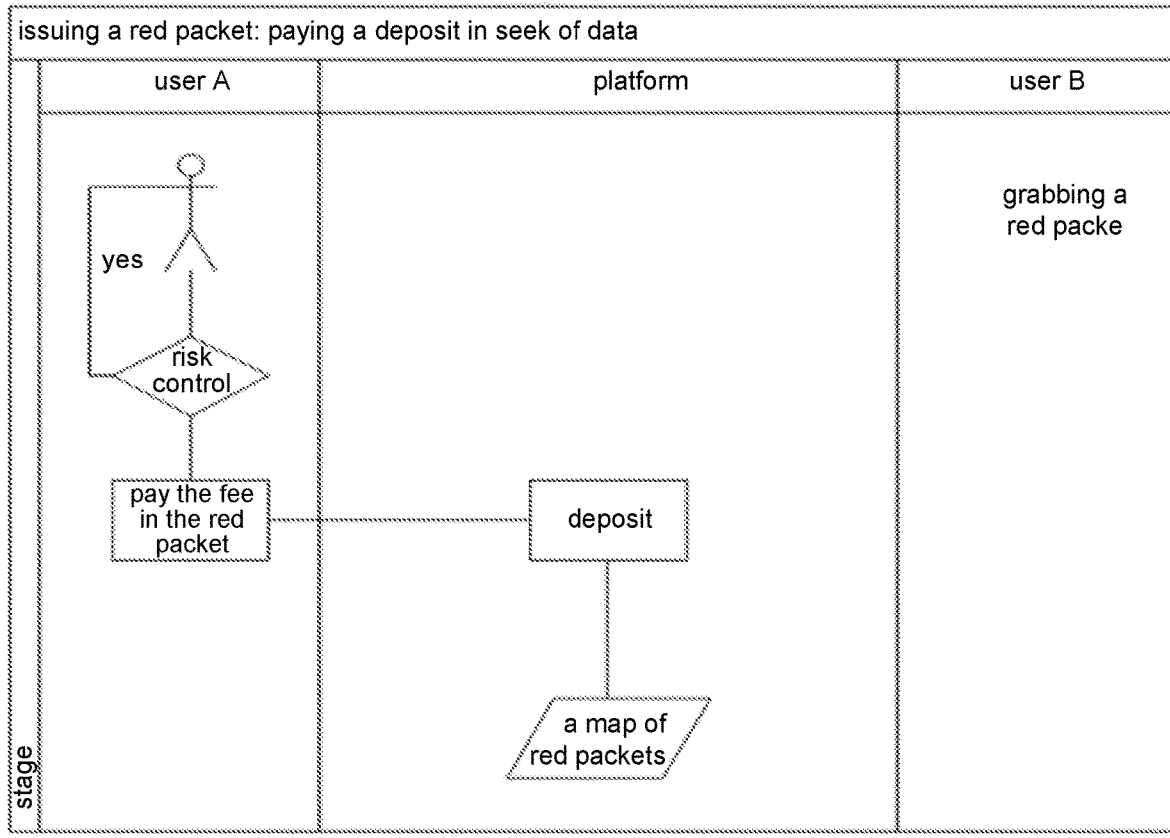
FIG. 2 shows a schematic diagram of a requesting user requesting data by paying deposit in an embodiment of the present application.

FIG. 2 shows a schematic diagram of a requesting user requesting data by paying deposit in an embodiment of the present application. User A with data gaps requests leasing of data for network access by offering a red packet. The red packet is configured with a data limit. User A pays for the red packet, which is guaranteed by a platform (a network device). The pre-paid red packet is deposited at the platform to ensure user B's expected benefit. The red packet is displayed on a map of red packets based on location information of the requesting user at the time of issuing the red packet, so that user B may grab the red packet according to the map of red packets and establish a hotspot leasing contract with a requesting user corresponding to the grabbed red packet. Here, when user A pays for the red packet, risk control and filtering needs to be performed on user A to determine whether user A is in the blacklist. Conditions for admission into the blacklist include historic negative ratings or complaints, malicious scalping and other violations. User B is guaranteed to grab a valid red packet and is able to provide a valid hotspot and is prevented from harassment for network need from malicious users.

According to yet another aspect of the present application, it is provided a method for hotspot leasing at an equipment of a supplying user. The method comprises: at step S31, acquiring a target data request packet from a data request packet; at step S32, generating hotspot information and transmitting the hotspot information to a network device, and establishing a hotspot leasing contract with a requesting user corresponding to the target data request packet on a basis of the network device transmitting the hotspot information to the requesting user. The hotspot information includes the hotspot name and password information. Here, the supplying user acquires one or more target data request packets, provides sharing of excess data for network access in a personal hotspot and transmits hotspot information to the network device. Hotspot information may include the name information, password information, MAC address information and geographic location information, etc. of the hotspot. The hotspot information is transmitted by the network device to the requesting user corresponding to the target data request packet. A hotspot leasing contract with the corresponding requesting user is established and fulfilled. Data is provided to the requesting user according to the contract and urgent needs for data for network access of one or more surrounding users are solved.

Here, the equipment of the supplying user is a user equipment of the user with excess data. The user equipment includes but is not limited to any type of mobile electronic product capable of human-machine interaction with users via a touchpad, for example, a smart phone, a tablet, etc. The mobile electronic products may run on any operating system, such as android operating system, iOS operating system, etc.

In an embodiment of the present application, at step S31, one or more target data request packets are acquired from the data request packets displayed on the map of data request packets. Wherein the data request packet comprises a data limit, user information of a requesting user, paid fees, and location information. Here, the data request packet may be a red packet. The red packet is configured with a data limit and further includes fee of the red packet paid by the requesting user, information of the requesting user, and location information. The data limit configured for the red packet corresponds to the fee paid by the requesting user, satisfying a calculation mechanism for data monetization, such as 0.1 RMB for 1M of data. Monetization of data is implemented for users with excess data by offering a red packet in seek of hotspot. Location information is used to display the red packet on the map of red packets and facilitates the supplying user to grab the red packet from the map of red packets. Information of the requesting user may include username and contact information of the requesting user, facilitating both parties to establish near-field hotspot connection and guarantee signal strength. When grabbing red packets from the map of red packets, the supplying user may grab one or more red packets. When the supplying user grabs a plurality of red packets, tests on hotspots could be performed sequentially according to the time when the red packets are grabbed. A data limit of each red packet is compared with the remaining data threshold of the supplying user one by one after the supplying user providing data corresponding to a previous red packet, and a network link is established between the supplying user and corresponding requesting users to whom the supplying user is able to provide data service.

In an embodiment of the present application, the method comprises: at step S33, receiving a charged fee transmitted by the network device corresponding to the hotspot data used by the requesting user. Here, the requesting user with data gaps seeks for leasing of data for network access by offering a red packet which is guaranteed by the network device. The data used by the requesting user for network access may not reach the data limit of the red packet. At this point, data used should be converted to a fee to be charged. And the supplying user is paid a fee corresponding to the data that has been provided. The supplying user receives a fee of a red packet converted from data used by the requesting user by the network device and may withdraw the red packet or use it in seek of near-field data.

In an embodiment of the present application, at step S32, based on the hotspot information, a network link is established with the requesting user; a test is performed on the network link and a test result is obtained; a hotspot leasing contract with the requesting user is established based on the test result. Wherein a test for the network link between the requesting user and the supplying user comprises at least one of: a test for connectivity of the link; a test for signal strength of the link; a test as to whether the data limit of the target data request packet is less than or equals to the data threshold of the supplying user. After a red packet is grabbed from the map of red packets, a test is performed on the hotspot, such as a signal strength test or a 5-second duration test. Problems that might occur after the hotspot leasing contract is established are prevented, such as poor network connectivity, low success rate of connection, poor user experience and a condition where the requesting user has to reestablish a hotspot leasing contract with other supplying users. It is tested whether the data limit of the target data request packet is less than or equals to the data threshold of the supplying user. If the data limit of the data request packet is greater than the data threshold of the supplying user, the supplying user is not qualified for the requesting user's need for data and thus a network link between both parties does not need to be established. With a comparison of the data limit of the data request packet with the data threshold of the supplying user, blind establishment of network link is prevented, thereby ensuring that both parties establish a valid hotspot leasing contract. The hotspot leasing contract with the supplying user corresponding to the grabbed red packet is established after successful hotspot test.

In an embodiment of the present application, after the hotspot leasing contract is terminated, rating information in terms of satisfaction on the requesting user may be transmitted. It could provide a pre-reference for potential offline conflicts and a data basis for risk control. Wherein before credit rating information on the requesting user is transmitted, risk control may be performed on the supplying user. In an example, it is determined whether the supplying user belongs to users in a preset blacklist. If not, rating information in terms of satisfaction on the requesting user is transmitted. Wherein users in the preset blacklist are determined by the network device via filter processing based on historic valid hotspot sharing behavior information and historic credit rating information of the user. Here, risk control is mainly dependent on whether there is a valid hotspot sharing behavior and whether rating contents are legal and compliant. It is determined whether the supplying user is qualified for rating before the supplying user rates. Malicious raters will be indicated by risk control and will be not allowed to rate. A main purpose of risk control is to ensure the integrity and effectiveness of ratings as well as the reference value for credit rating. Therefore, users with no valid hotspot connection or with illegal and incompliant rating contents are not allowed to rate due to lack of reference values.

Figure 3:
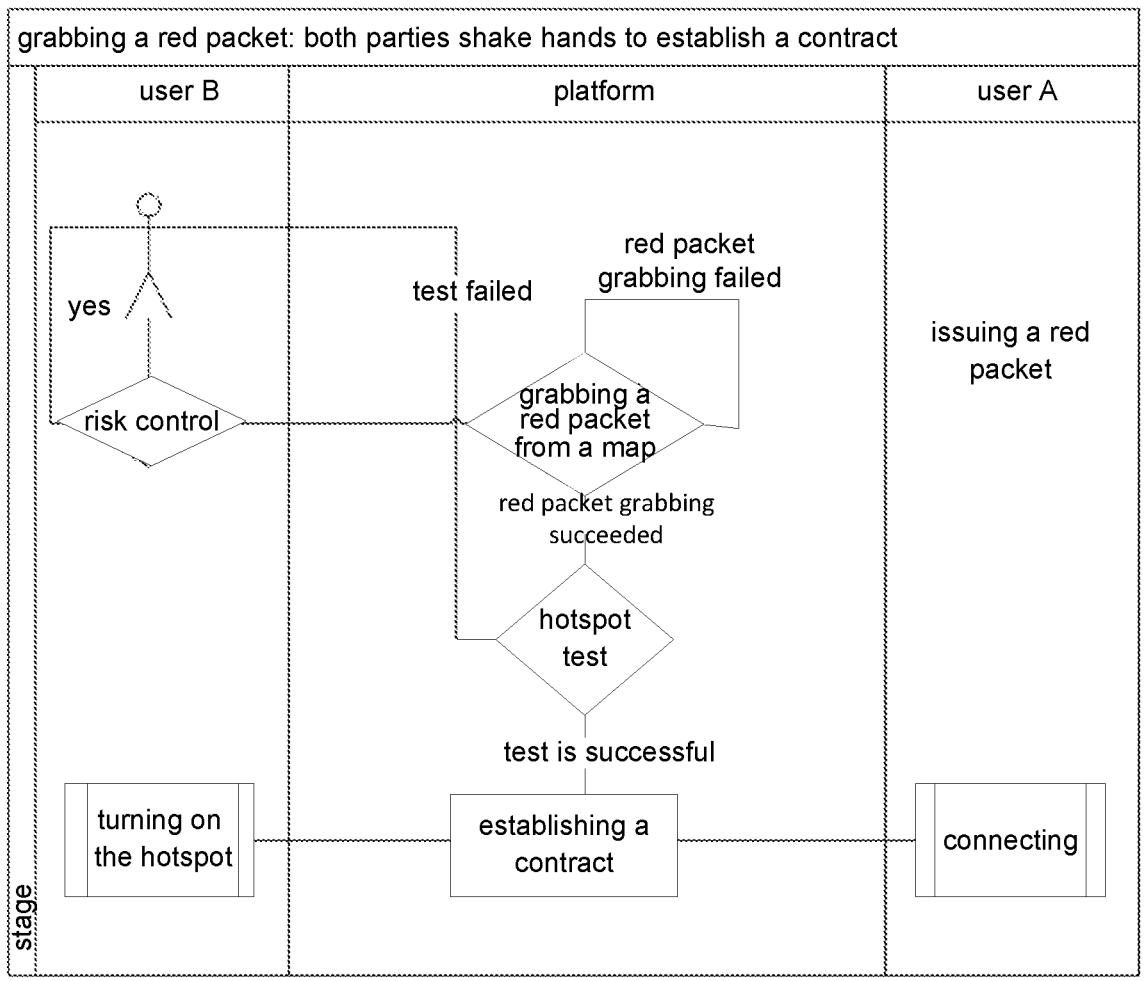
FIG. 3 shows a schematic diagram of a requesting user establishing a hotspot leasing contract with a supplying user in an embodiment of the present application.

FIG. 3 shows a schematic diagram of a requesting user establishing a hotspot leasing contract with a supplying user in an embodiment of the present application. User B is the supplying user and user A is the requesting user. User B grabs red packets according to a map of red packets. If user B fails, user B may continue browsing or wait. If user B succeeded in grabbing a red packet, a test on hotspot is performed to test whether a data threshold is greater than the amount of data needed by user A. After the test on hotspot is passed, user B provides sharing of excess data in a personal hotspot and turns on the personal hotspot. User A receives the hotspot information transmitted by a platform and provided by user B, connects to the Internet and establishes a contract with user B. During the process, before user B grabs red packets from the map of red packets, risk control may be performed on user B to determine whether user B is in the blacklist. Conditions for admission into the blacklist include low compliance rate of contracts, historic negative ratings or complaints, malicious scalping and other violations. Penalties are applied to dishonest user B who maliciously cuts off data provision. Users with extremely low credit ratings are included in the blacklist. Penalties are applied to the supplying users according to for example the credit ratings of the supplying users. Users with occasional breach of trust are allowed to grab red packets. It is not suitable for users with frequent breach of trust to provide red packet data service and grab red packets, thus they are prohibited from grabbing red packets.

Figure 4:
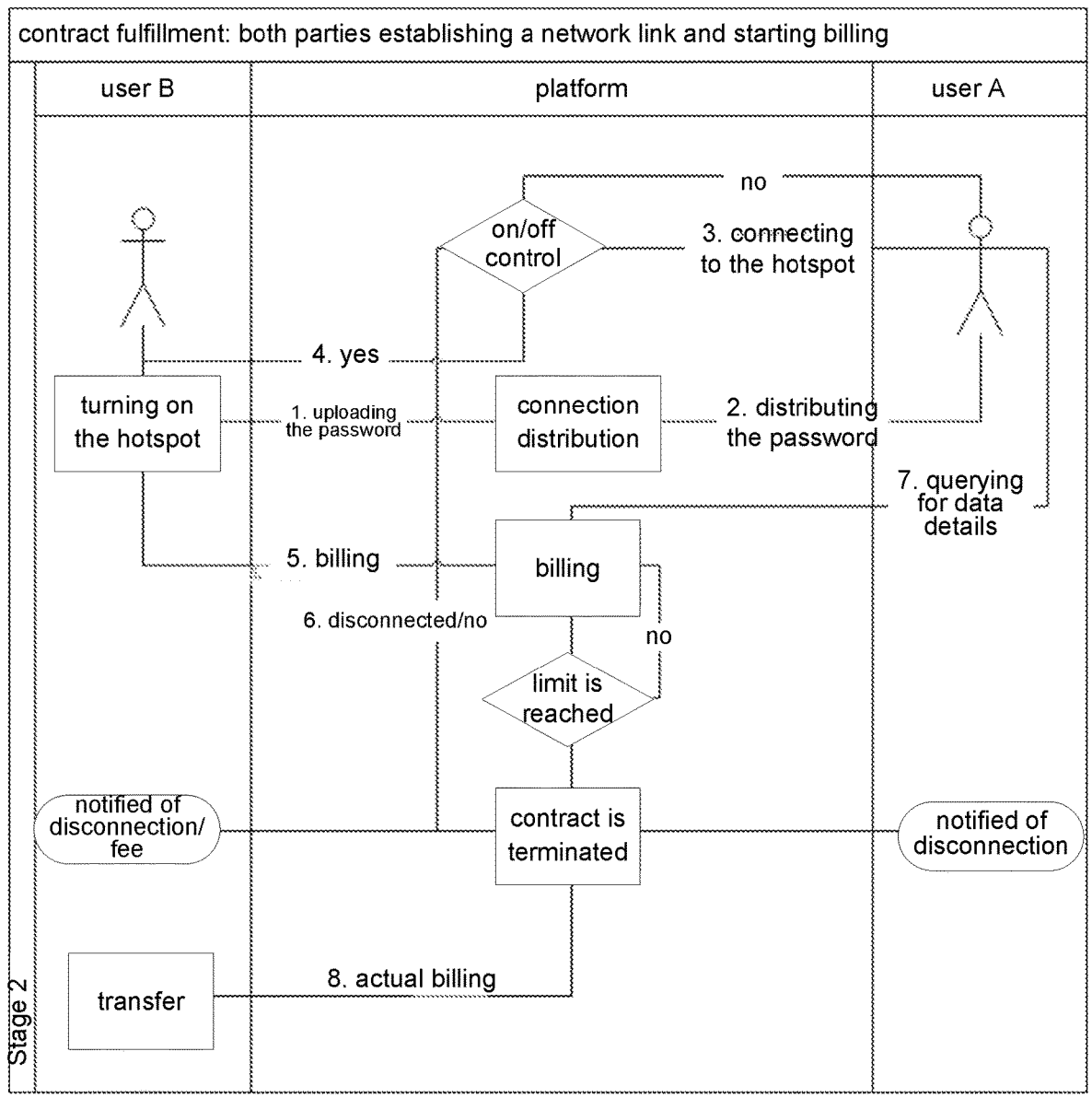
FIG. 4 shows a schematic diagram of implementation of a process for hotspot leasing in an embodiment of the present application.

FIG. 4 shows a schematic diagram of implementation of a process for hotspot leasing in an embodiment of the present application. User A is the requesting user, user B is the supplying user and the network device is the platform. After user B grabs a red packet, user B provides sharing of excess data in a personal hotspot and uploads password to the platform. The platform distributes the password of the hotspot to user A. User A connects to the hotspot according to the received password. The platform controls on and off of the connection to the hotspot and determines whether the hotspot provided by user B is secure. If the hotspot is secure, connection to the hotspot is turned on by the network device. The network device continuously detects whether the data used by user A reaches the data limit of the red packet. For example, the network device notifies user A if there is 2M of data remaining from the data limit. The network link between user A and user B will be disconnected when the limit is reached. The network device starts to monitor the data used by user A in real time after turning on the connection to the hotspot provided by user B and converts the actual data used by user A into a fee to be charged in red packet. When the connection is disconnected according to the contract or accidentally, the hotspot leasing contract is terminated. User A is notified of the disconnection and user B is notified of a fee for due to the disconnection. A fee corresponding to the actual data used by user A is transferred to user B. During the fulfillment of the contract, both parties of the leasing contract may query data usage details. In an example, user A may query data used by himself/herself. User B may query data usage of each requesting user to whom user B provides its hotspot. It should be noted that a premise for the successful establishment of a hotspot leasing contract between the supplying user and the requesting user is that the price for data is not higher than the price of data plans provided by the operators. One supplying user may grab a plurality of hotspot task red packets. Once a hotspot leasing contract is established, both parties have a right to use data on an equal basis and the on/off of the connection is controlled and supervised by the platform. Since an application scenario for a hotspot leasing contract may be a near-field lease and sale, ambiguities generated during the process of data usage by both parties may be communicated and settled offline. Costs of data for network access are reduced for both parties by the above method of sharing data. The platform, as the only channel for communication of hotspot password and connection, makes account management and data management transparent to the users, and may establish a quick communication path such as a chatting room for both parties of leasing and selling. Demand docking is provided for both parties of leasing and selling by using the hotspot leasing of the present application, which improves data utilization.

In addition, in an embodiment of the present application, it is also provided a computer readable medium having computer readable instructions stored thereon, the computer readable instructions being executable by a processor to implement the above mentioned methods.

According to yet another aspect of the present application, it is also provided a network device for hotspot leasing. The network device comprises:

one or more processors; and a memory storing computer readable instructions, wherein the computer readable instructions, when executed, cause the processor to perform the operations of the above mentioned methods.

In an example, the computer readable instructions, when executed, cause the one or more processors to: acquire a data request packet of a requesting user; based on a target data request packet acquired by a supplying user from the data request packet, transmit hotspot information provided by the supplying user to the requesting user corresponding to the target data request packet, and establish a hotspot leasing contract between the requesting user and the supplying user.

According to another aspect of the present application, it is also provided an equipment of a requesting user for hotspot leasing. The equipment of the requesting user comprises:

one or more processors; and a memory storing computer readable instructions, wherein the computer readable instructions, when executed, cause the processor to perform the operations of the above mentioned methods.

In an example, the computer readable instructions, when executed, cause the one or more processors to: transmit a data request packet of the requesting user; establish a hotspot leasing contract with a supplying user based on received hotspot information provided by the supplying user.

According to a further aspect of the present application, it is also provided an equipment of a supplying user for hotspot leasing. The equipment of the supplying user comprises:

one or more processors; and a memory storing computer readable instructions, wherein the computer readable instructions, when executed, cause the processor to perform the operations of the above mentioned methods.

In an example, the computer readable instructions, when executed, cause the one or more processors to: acquire a target data request packet from a data request packet; transmit hotspot information to a network device, and establish a hotspot leasing contract with a requesting user corresponding to the target data request packet on a basis of the network device transmitting the hotspot information to the requesting user.

Obviously, those skilled in the art may make various modifications and variations to the present application without departing from the spirit and scope of the present application. In this way, if these modifications and variations to the present application fall within the scope of the claims of the present application and their equivalent technologies, the present application is also intended to encompass these modifications and variations.

It should be noted that the present application may be implemented in software and/or a combination of software and hardware, for example, by using an application specific integrated circuit (ASIC), a general purpose computer, or any other similar hardware device. In one embodiment, the software program of the present application may be executed by a processor to implement the steps or functions described above. Likewise, the software programs (including related data structures) of the present application may be stored in a computer readable storage medium such as a RAM memory, a magnetic or optical drive or a floppy disk and the like. In addition, some of the steps or functions of the present application may be implemented in hardware, for example, as a circuit that cooperates with a processor to perform various steps or functions.

In addition, a portion of the present application may be embodied as a computer program product, such as computer program instructions, when executed by a computer, may invoke or provide a method and/or technical solution in accordance with the present application. The program instructions for invoking the method of the present application may be stored in a fixed or removable storage medium, and/or transmitted by a data stream in a broadcast or other signal carrier medium, and/or stored in a working memory of the computer device in which the program instructions run. Herein, an embodiment in accordance with the present application includes an apparatus including a memory for storing computer program instructions and a processor for executing program instructions, wherein when the computer program instructions are executed by the processor, triggering the apparatus to operate the aforementioned methods and/or technical solutions in accordance with various embodiments of the present application.

For those skilled in the art, it is apparent that the present application is not limited to the details of the above-mentioned exemplary embodiments, and the present application may be implemented in other specific forms without departing the spirit or basic features of the present application. Therefore, the present embodiments are to be considered as illustrative and not restrictive. The scope of the present application is defined by the appended claims rather than the above-mentioned description, and therefore it is intended that all changes which fall within the meaning and range of equivalency of the claims are embraced in the present application. Any reference signs in the claims should not be construed as limiting the claims involved. In addition, it is apparent that the word "comprising" does not exclude other elements or steps, and the singular does not exclude the plural. A plurality of units or means stated in the apparatus claims may also be implemented by one unit or means by means of software or hardware. The terms first and second and the like are used to represent names and do not represent any particular order.

What is claimed is:

1. A method for hotspot leasing at a network device, the method comprising:
    acquiring a data request packet transmitted by a requesting user;
    based on a target data request packet acquired by a supplying user from the data request packet, transmitting hotspot information provided by the supplying user to the requesting user corresponding to the target data request packet, and establishing a hotspot leasing contract between the requesting user and the supplying user,
    wherein the step of transmitting the hotspot information provided by the supplying user to the requesting user corresponding to the target data request packet and establishing the hotspot leasing contract between the requesting user and the supplying user comprising:
    transmitting the hotspot information provided by the supplying user to the requesting user corresponding to the target data request packet for the requesting user and the supplying user to establish a network link, wherein the hotspot information comprises a hotspot name and password information for access;
    establishing the hotspot leasing contract between the requesting user and the supplying user based on a received test result of the network link between the requesting user and the supplying user.

2. The method according to claim 1, wherein the method further comprising:
    determining whether the requesting user is allowed to transmit the data request packet based on historic rating information of the requesting user or based on historic rating information and historic valid hotspot sharing behavior information of the requesting user;
    and/or
    determining whether the supplying user is allowed to acquire the target data request packet from the data request packet based on historic valid hotspot sharing behavior information of the supplying user or based on historic valid hotspot sharing behavior information and historic rating information of the supplying user.

3. The method according to claim 1, wherein after acquiring the data request packet of the requesting user, the method further comprising:
    displaying the acquired data request packet on a map of data request packets based on location information of the requesting user, wherein the data request packet comprises a data limit, user information of the requesting user, paid fees, and location information.

4. The method according to claim 3,
    wherein a test for the network link between the requesting user and the supplying user comprises at least one of:
    a test for connectivity of the link;
    a test for signal strength of the link;
    a test as to whether the data limit of the target data request packet is less than or equals to a data threshold of the supplying user.

5. The method according to claim 4, wherein after establishing the hotspot leasing contract between the requesting user and the supplying user, the method further comprising:
    transmitting acquired data usage information for the hotspot leasing contract to the requesting user or the supplying user based on a query request from the requesting user or the supplying user.

6. The method according to claim 4, wherein after establishing the hotspot leasing contract between the requesting user and the supplying user, the method further comprising:
converting hotspot data used by the requesting user to a corresponding fee to be charged based on a preset trigger condition and forwarding the fee to be charged to the supplying user, and terminating the hotspot leasing contract.

7. The method according to claim 6, wherein the preset trigger condition comprises at least one of:
the hotspot data used by the requesting user reaches the data limit of the target data request packet;
the network link between the requesting user and the supplying user is disconnected when hotpot data used by the requesting user does not reach the data limit of the target data request packet;
the network link between the requesting user and the supplying user is disconnected when total data used by the requesting user and the supplying user reaches a data threshold of the supplying user.

8. The method according to claim 7, wherein after terminating the hotspot leasing contract, the method further comprising:
determining whether the requesting user is allowed to rate the supplying user in terms of satisfaction based on historic rating information and/or historic valid hotspot sharing behavior information of the requesting user; and/or
determining whether the supplying user is allowed to rate the requesting user in terms of satisfaction based on historic valid hotspot sharing behavior information and/or historic rating information of the supplying user.

9. The method according to claim 7, wherein before establishing the hotspot leasing contract between the requesting user and the supplying user, the method further comprising:
notifying the requesting user to shut down automatic update behavior from occurring when connected to the hotspot.

10. The method according to claim 9, wherein after establishing the hotspot leasing contract between the requesting user and the supplying user, the method further comprising:
based on data usage information for the hotspot leasing contract and a preset alerting data amount, transmitting notification information indicating that the total data used has reached the preset alerting data amount to the requesting user and/or the supplying user.

11. The method according to claim 1, wherein the method further comprising:
creating an instant communication between the requesting user and the supplying user based on the hotspot leasing contract between the requesting user and the supplying user.

12. A method for hotspot leasing at an equipment of a requesting user, the method comprising:
transmitting a data request packet of the requesting user;
establishing a hotspot leasing contract with a supplying user based on received hotspot information provided by the supplying user,
wherein the step of establishing the hotspot leasing contract with the supplying user based on the received hotspot information provided by the supplying user comprising:
receiving the hotspot information transmitted by a network device and provided by the supplying user, and establishing a network link with the supplying user,
performing a network link test on the network link;
establishing the hotspot leasing contract with the supplying user based on a test result.

13. The method according to claim 12, wherein the data request packet comprises a data limit, user information of the requesting user, paid fees, and location information.

14. The method according to claim 12,
wherein the network link test comprises at least one of:
a test for connectivity of the link;
a test for signal strength of the link.

15. The method according to claim 12, wherein after terminating the hotspot leasing contract, the method further comprising:
transmitting rating information in terms of satisfaction on the supplying user.

16. A method for hotspot leasing at an equipment of a supplying user, the method comprising:
acquiring a target data request packet from data request packets;
generating hotspot information and transmitting the hotspot information to a network device, and establishing a hotspot leasing contract with a requesting user corresponding to the target data request packet on a basis of the network device transmitting the hotspot information to the requesting user,
wherein the step of establishing the hotspot leasing contract with the requesting user comprising:
establishing a network link with the requesting user based on the hotspot information;
performing a network link test on the network link;
establishing the hotspot leasing contract with the requesting user based on a test result.

17. The method according to claim 16, wherein after establishing the hotspot leasing contract with the requesting user, the method further comprising:
receiving a fee to be charged corresponding to hotspot data used by the requesting user which is transmitted by the network device.

18. The method according to claim 16, wherein the step of acquiring the target data request packet from the data request packets comprising:
acquiring one or more target data request packets from the data request packets displayed on a map of data request packets, wherein the data request packet comprises a data limit, user information of a requesting user, paid fees, and location information.

19. The method according to claim 18,
wherein the network link test comprises at least one of:
a test for connectivity of the link;
a test for signal strength of the link;
a test as to whether the data limit of the target data request packet is less than or equals to a data threshold of the supplying user.

20. The method according to claim 16, wherein after terminating the hotspot leasing contract, the method further comprising:
transmitting rating information in terms of satisfaction on the requesting user.

* * * * *

UNITED STATES PATENT AND TRADEMARK OFFICE
CERTIFICATE OF CORRECTION

| | | |
|---|---|---|
| PATENT NO. | : 11,411,846 B2 | Page 1 of 1 |
| APPLICATION NO. | : 16/804009 | |
| DATED | : August 9, 2022 | |
| INVENTOR(S) | : Tingting Yu | |

It is certified that error appears in the above-identified patent and that said Letters Patent is hereby corrected as shown below:

On the Title Page

Item (30) Please add Foreign Application Priority Data: CHINA 201710761825.9 08/30/2017

Signed and Sealed this
Thirteenth Day of September, 2022

Katherine Kelly Vidal
*Director of the United States Patent and Trademark Office*